United States Patent [19]
Sickels et al.

[11] Patent Number: 5,953,813
[45] Date of Patent: Sep. 21, 1999

[54] FASTENER RETAINING DEVICE FOR ASSEMBLY PARTS

[75] Inventors: David W. Sickels, Plymouth, Mich.; Wolfgang Luckhardt, Königstein; Heinrich Luckhardt, deceased, late of Franfurt am Main, both of Germany, by Wolfgang Luckhardt, Christoph Luckhardt, legal representatives

[73] Assignee: Multifastener Corporation, Detroit, Mich.

[21] Appl. No.: 08/482,760

[22] Filed: Jun. 7, 1995

Related U.S. Application Data

[63] Continuation-in-part of application No. 08/307,849, filed as application No. PCT/EP93/00836, Apr. 2, 1993, Pat. No. 5,636,426.

[30] Foreign Application Priority Data

Apr. 3, 1992 [DE] Germany .................................. 4211276

[51] Int. Cl.⁶ .............................. B23P 19/06; B23P 23/04; B21J 15/32
[52] U.S. Cl. .............................. 29/798; 29/818; 81/57.37; 269/254 R
[58] Field of Search .............................. 29/432, 505, 798, 29/809, 818, 281.6; 227/10, 52, 77, 113, 139, 150; 81/57.37; 269/254 R

[56] References Cited

U.S. PATENT DOCUMENTS

| | | | |
|---|---|---|---|
| 1,503,861 | 8/1924 | Stimpson | 81/57.37 X |
| 1,506,788 | 9/1924 | Stimpson | 227/116 |
| 3,061,837 | 11/1962 | Kent | 227/77 X |
| 4,454,650 | 6/1984 | Silver | 29/818 |
| 4,607,418 | 8/1986 | Horfner | 29/432 X |
| 4,698,905 | 10/1987 | Taga | 29/798 |
| 5,172,467 | 12/1992 | Muller | 29/798 X |

FOREIGN PATENT DOCUMENTS

| | | |
|---|---|---|
| 539493 | 2/1972 | Germany . |
| 2263648 | 7/1974 | Germany . |
| 8227676 | 3/1985 | Germany . |
| 3820898 | 11/1988 | Germany . |
| 3448219 | 5/1990 | Germany . |
| 3937903 | 5/1991 | Germany . |
| 4211276 | 1/1993 | Germany . |
| 9319890 | 10/1993 | WIPO . |

*Primary Examiner*—Peter Vo
*Attorney, Agent, or Firm*—Howard & Howard

[57] ABSTRACT

An installation tool, fastener, and method for installing the fastener are disclosed. The installation tool has control fingers which control the position of the fastener with respect to the plunger and workpiece to which the fastener is to be attached during the entire travel of the fastener from the entry into the installation tool to installation in the workpiece. The fingers are pivotally mounted to the plunger and travel with the plunger throughout the installation path. The fingers are adapted to engage the fastener in a displaced area on the fastener so that the fingers can control the fastener through installation of the fastener into the workpiece. The displaced area is positioned between the top and bottom of the fastener so that the fingers can maintain control throughout installation.

4 Claims, 3 Drawing Sheets

5,953,813

FASTENER RETAINING DEVICE FOR ASSEMBLY PARTS

The application is a continuation-in-part of U.S. patent application Ser. No. 08/307,849 filed on Sep. 30, 1994 in the name of Heinich Luckhardt now U.S. Pat. No. 5,636,426, which claims the benefit of PCT International application No. PCT/EP93/00836 filed Apr. 2, 1993, and the benefit of German Application No. P4 211276.1 filed on Apr. 3, 1992. This invention relates to installation heads and, in particular, discloses an improved installation head with holding fingers that interact with an improved fastener to ensure proper alignment of the fastener from its entry into the installation head until the fastener is installed in a workpiece. The present invention is suited for use with any type of fastener, particularly pierce-type fasteners.

BACKGROUND

In the mass production of parts, fastener installation tools are commonly used to simultaneously install fasteners in, for example, a panel, as the panel is being formed in a press. The installation tool is mounted in the press and, as the press closes, the fastener is installed. The installation tool has a housing, a plunger passage, a plunger operatively mounted in the plunger passage, and a fastener feed mechanism that feeds fasteners into the plunger passage. The passage and the fastener have complementary shapes, and the plunger is adapted to drive the fastener through the passage into the panel. To assist in the initial alignment of the fastener with respect to the plunger, catches are used to hold the fastener in the passage as the fastener enters. Once the plunger contacts the fastener, the fastener either drops through to the workpiece or is temporarily held by, for example, spring-loaded detents extending into the passage.

Although the passage and fastener are configured to facilitate the proper alignment of the fastener with respect to the plunger and the panel, the fastener can become misaligned within the passage. For example, if the detents stick or fail, the fastener will cock in the passage and be misaligned when it is driven into the panel. Misalignment problems are exacerbated when the installation tool is not vertically oriented with respect to the workpiece. Non-vertical orientations are very common. As should be appreciated, misalignment can result in faulty installations, damage to the part, and damage to the installation tool.

The installation head illustrated in U.S. patent application Ser. No. 08/307,849 overcomes the above problems. However, it does have disadvantages. First, the fingers which hold the fastener against the plunger do not hold the fastener at the critical point of contact with the workpiece. It has been found by Applicant that it is important to hold the fastener until at least the installation end of the fastener engages the workpiece so that the fastener is being held between the plunger and the workpiece. At this point, the fingers can be removed and proper installation will be ensured. Additionally, Applicant has found that in many applications, it is important that the fingers maintain guiding contact with the fastener until the fastener is completely installed in the panel. Neither of these holding techniques can be achieved by the disclosed invention because the fingers are cammed away from the fastener through contact with the panel surface. By definition, the fingers release the fastener prior to the fastener making installation contact with the panel. Although this distance is slight, it is sufficient to result in misalignment of fasteners. This is particularly true, since the panel surface is required to act as a cam surface when, in fact, it is not designed to be a cam surface. Therefore, any restriction of the fingers can result in the fingers not moving properly and resulting in a cocked fastener at the critical installation point. It should be appreciated that any tilting of the fastener at installation can result in an improper installation of the fastener.

Another disadvantage to the installation head disclaimed in the co-pending application is the potential marring of the panel surface due to the fingers being cammed against the surface at installation. This marring can be unacceptable in many applications, resulting in rejected panels and increased manufacturing costs.

BRIEF SUMMARY OF THE INVENTION

The present invention overcomes the above problems by providing an installation tool having fingers that hold a fastener from the point that the fastener enters the plunger passage until the fastener is either partially or completely installed in, for example, a panel. The term "panel" is used herein to define the workpiece, and panel may include, for example, a plate, sheet metal part, such as a body panel, bracket, or structural member. Further, the present invention includes an improved fastener that has sides that are displaced to mate with the free ends of the fingers in the installation tool so that the fastener can be held and guided throughout its path of travel. Still further, the present invention includes a method for installing a fastener with an installation tool so that the fastener is held throughout its travel to ensure a properly aligned, properly installed fastener. The present invention is described with respect to pierce-type fasteners but would be suited for other types of fasteners, such as rivet-type fasteners, weld nuts, etc.

The installation tool of the present invention has a main body with a nosepiece having a bore or fastener passage and a fastener entry path for inserting fasteners into the passage adjacent the plunger. The nosepiece reciprocates relative to the plunger which has a free end adapted to engage the fastener when the fastener is in the bore for driving the fastener through the main body and into a panel or other workpiece. At least two fingers are operatively connected to and pivotally mounted with respect to the plunger and the fastener. The fingers extend beyond the free end of the plunger for engaging the fastener and, in particular, for engaging a displaced area formed on the fastener. The fingers hold the fastener adjacent the plunger as the plunger drives the fastener to the panel. This ensures that the fastener is positively held in a properly aligned position with respect to the plunger and the panel from the point that the fastener enters the plunger passage to at least engagement of the fastener against the panel.

The fastener of the present invention is specifically designed for installation by the installation head of the present invention. The fastener includes top, bottom, and sides, with the bottom having a configuration that, when pressed into a workpiece, will interlock the bottom of the fastener with the workpiece material to provide a strong connection between the fastener and the workpiece. As will be understood, top, bottom, side, etc., are relative terms used for ease of description; however, the installation head of this invention may be adapted to attach a fastener to a panel in most any attitude and thus such terms are not limiting. The side of the fastener includes a displaced area that is positioned between the top and bottom of the fastener. The displaced area is adapted to receive the fingers in a positive inter-engagement between the fastener and the installation tool fingers to accurately position and align the fastener with respect to the workpiece. The displacement area is defined by a displaced portion in the side of the fastener which mates with the free end of the fingers of the installation tool. The displaced surface can be in the shape of a groove having a generally semi-circular or triangular cross-section; a ridge having a generally semi-circular cross-section; an indent which is adapted to receive a protrusion on the free end of the fingers; a protrusion which is adapted to be received within an indent on the free end of the fingers; a slot which extends perpendicular to the top and bottom surfaces, etc. It should be appreciated by those of ordinary skill in the art that many different types of displaced surfaces will provide the positive engagement between the fingers and the fastener.

The fingers of the present invention are disclosed in three different embodiments; however, it should be appreciated by those of ordinary skill that other embodiments would fall within the scope of the invention. It is critical that the fingers be mounted to the plunger and hold a fastener until at least the point when the fastener is trapped between the plunger and the workpiece before the fingers release the fastener. In one embodiment, the fingers are pivotally mounted to the plunger and the pivotal movement is controlled by adjoining contoured surfaces on the finger and nosepiece which slide with respect to one another as the nosepiece moves with respect to the plunger. In this embodiment, the outer edge of the finger, away from the plunger, is contoured and engages the inner wall of the plunger passage in the nosepiece, which has a complementary contour. The finger contour includes a guide or control portion which engages a complementary guide portion on the nosepiece which corresponds to the finger being forced inwardly in the direction of the plunger to hold the fastener adjacent the end of the plunger. Above the guide surface, in the direction opposite the workpiece, there is an offset region which is adapted to mate with an offset region in the nosepiece to provide sufficient space for the finger to pivot away from the fastener. The fingers release the fastener by the withdrawal of the plunger from the fastener after complete installation. In this embodiment, the gripping tip of the finger and the displaced side of the fastener are formed with cam surfaces which permit the fingers to pivot with respect to the fastener as the plunger is retracted after installation.

In a further embodiment, the fingers are pivotally mounted to the plunger and have a cam surface at one end opposite the gripping tips of the fingers. The free end of the fingers, which define the gripping tips, are adapted to engage the displaced area of the fastener. The fingers are forced into engagement with the displaced area of the fastener by a spring or opposed springs which extend between the finger and the plunger. In one embodiment, there is a recess formed in the nosepiece which receives a spring head, and legs extend from the head to bias against the finger. Alternatively, a recess could be formed in the plunger which would engage the opposite side of the finger to bias the finger into engagement with the fastener. In this embodiment, the spring engages the finger above the pivot point which is between the gripping tip and the spring engagement point. In this embodiment, when the fastener has been fully installed, retraction of the plunger causes the gripping tip to cam against the displaced portion of the fastener to pivot the fingers against the bias of the spring and release the gripping tips from the fastener.

It will be apparent to one of ordinary skill that other embodiments could be used to obtain similar results and objectives and still be within the scope of the invention. With reference to the following brief description of the drawings and disclosure, the invention will be described.

DETAILED DESCRIPTION OF THE INVENTION

Figure 1:
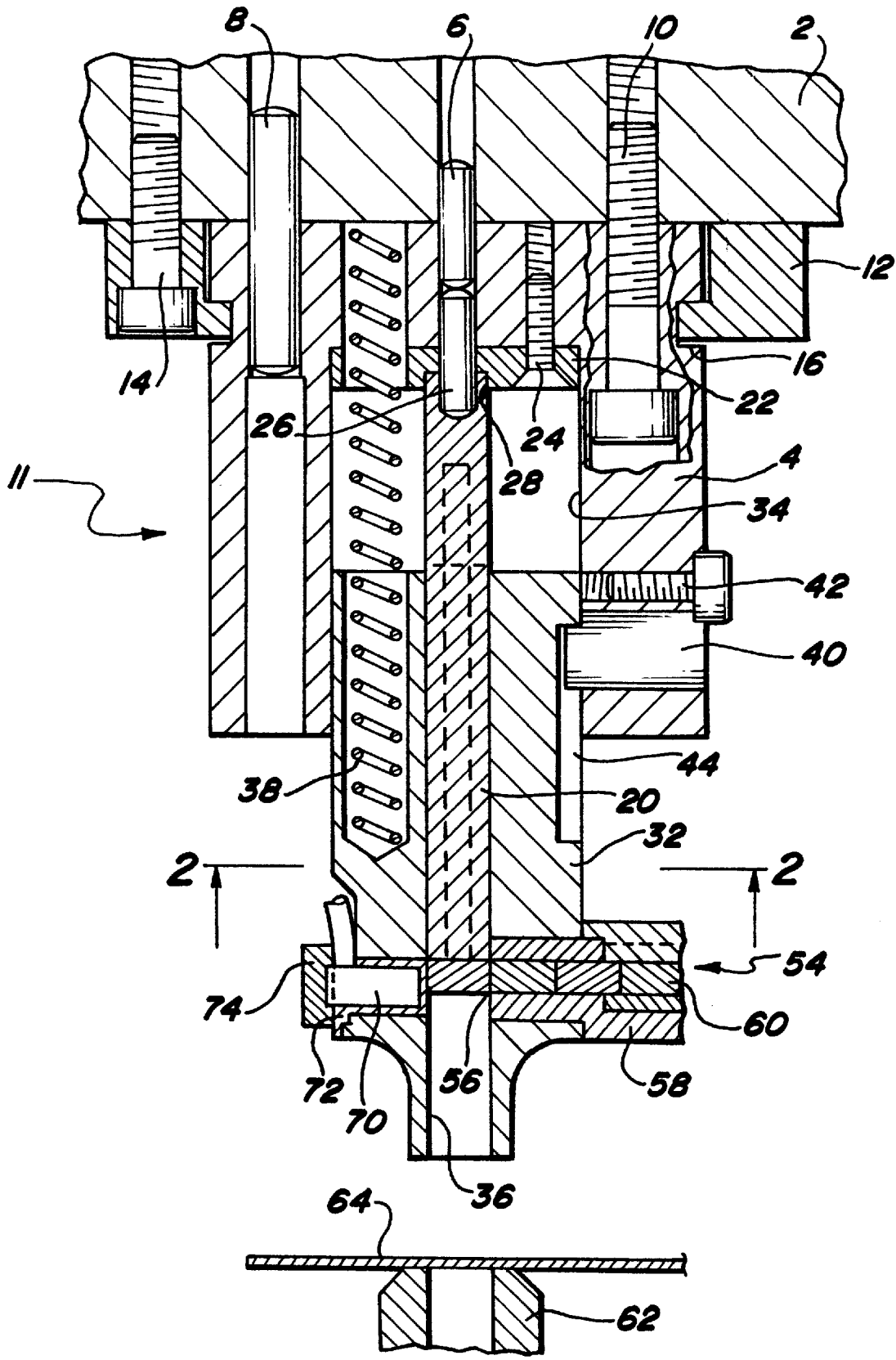
FIG. 1 is a longitudinal cross-section through an installation tool of the present invention.

The installation tool of the present invention is shown generally at 11 in FIG. 1. Installation tool 11 is mounted to a press which is shown generally at 2. Press 2 can be moved up and down by a conventional actuator which is not illustrated. Installation tool 11 has a housing 4 which is positioned with respect to press 2 by centering pins 6 and 8 and is tightened against the lower side of press 2 by screws 10 or by clamping catches 12. The clamping catches 12 have protrusions that engage into transverse grooves 16 of the housing and are attached by screws 14 to press 2.

A plunger 20 is securely attached to housing 4 through a pressure plate 22 located between the plunger and the housing 4. The pressure plate 22 is attached by screws 24 to housing 4. A centering pin 26 is received within a bore in the pressure plate 22 and extends into a bore of the housing 4 adjacent centering pin 6. The centering pin 26 provides relative positioning between the housing 4 and the plunger 20 and pressure plate 22.

A guidepiece or nosepiece 32 is mounted in an opening 34 located in housing 4. The nosepiece 32 is adapted to longitudinally reciprocate with respect to the housing 4. The nosepiece 32 defines an interior plunger passage 36. Plunger 20 extends into passage 36 and slides in the plunger passage 36 during any relative shift in position between the nosepiece 32 and housing 4.

The nosepiece 32 is held under tension by four helical compression springs 38, which are arranged around the plunger 20 within the guide opening 34. In the disclosed embodiment, springs 38 extend between nosepiece 32 and press 2. Tension is applied against nosepiece 32 in a direction away from the press 2, forcing the nosepiece in the direction of the workpiece or panel 64. A locking key 40 limits the outward movement of nosepiece 32. Key 40 is held in place by a locking screw 42 which extends into housing 4. Key 40 has a protrusion that extends into a slot 44 in the nosepiece 32.

In the disclosed invention, the plunger 20 and the plunger passage 36 have the same rectangular cross-section and the nosepiece 32 and guide openings 34 have the same rectangular cross-section. Thus, a precise control and positioning of the plunger 20 relative to the nosepiece 32 and the nosepiece 32 relative to the housing 34 is assured. At the same time, the choice of this cross-sectional shape achieves a simple rotational lock of the plunger 20 and of the guidepiece 32.

Fasteners 60 are fed into the plunger passage 36 by a conventional feeding device 54, which is not shown in detail. Feeding device 54 has an inlet line 58 with an inlet opening 56 that laterally intersects the nosepiece 32. The inlet line 58 feeds fasteners 60 into the plunger passage 36 through lateral inlet opening 56. The fasteners 60 are sequentially pushed into the passage 36 adjacent or below the plunger 20 which then drives the individual fasteners 60 in the direction of a workpiece which is disclosed as a sheet metal panel 64.

A stationary bottom die 62 is mounted below the nosepiece 32. Sheet metal panel 64 is positioned on the die 62 between die 62 and plunger 20. The fasteners 60 are then pressed into the sheet metal panel as press 2 closes. As the press closes, the nosepiece 32 is displaced relative to the housing 4 and relative to the plunger 20, so that the plunger 20 drives the fastener 60 from its position in plunger passage 36 adjoining the inlet opening 56, downward through the plunger passage to the panel 64. Based upon the simple rotation-lock control between guidepiece 32 and the guide opening 34 and between plunger 20 and the passage 36, accurate alignment of the plunger passage 36 to the stationary bottom die 62 is achieved. This is critical when the joined parts, such as rectangular pierce or clinch nuts, must be pressed into the sheet metal 64 in accurate aligned relationship with respect to the panel.

It is preferable that the parts slide with respect to each other. It is also preferable that the parts not require lubrication. Therefore, the housing 4 and the guidepiece 32 are preferably manufactured from bronze, while the plunger 20 is manufactured from tool steel.

Figure 2:
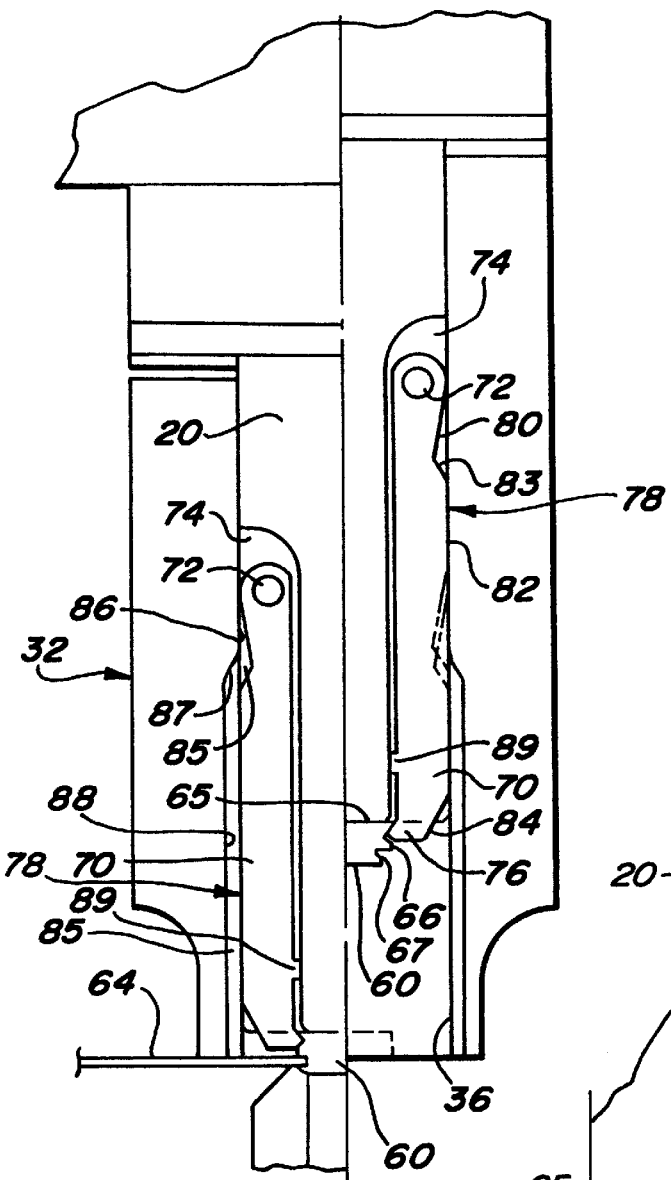
FIG. 2 is a longitudinal cross-section through the retaining device of the installation tool of FIG. 1, where the retaining device is shown in various operating states in the left and right sides of FIG. 1.

With reference to FIG. 2, the fastener control fingers 70 are illustrated. In the preferred embodiment, there are two fingers 70 positioned to generally intersect the entry path of the fasteners entering through inlet opening 56. The fingers 70 are pivotally mounted to the plunger 20 through pivot pins 72. The plunger 20 has slots 74 for receipt of the fingers 70 to reduce the overall size of the plunger 20 and nosepiece 32. The control fingers 70 pivot with respect to the plunger 20 to engage and disengage the fastener 60. The free end 76 of each finger 70 is configured to mate with a displaced area 66 on the side of the fastener 60. The displaced area 66 will be described in greater detail below.

Pivotal movement of the fingers 70 is controlled by mating cam surfaces on the fingers 70 and the inner wall of the nosepiece 32. Each of the fingers 70 has a contoured edge 78 opposite the fastener 60. The edge 78 has an offset 80 and a guide or control surface 82 which are joined by a transition surface 83. As disclosed, the control surface 82 ends in an angled surface 84. The inner wall of the nosepiece is contoured with a control surface 86 and an offset 88 which are joined by a transition surface 87. In the preferred embodiment, the surfaces 86, 87 and 88 are the base of slots cut into the inner wall of the nosepiece 32 to reduce the width of the nosepiece. The opposite edge of the finger 70 includes a stop 89 which controls the amount of inward pivotal movement of the finger 70.

In operation, with the plunger 20 in the position illustrated to the right in FIG. 2, a fastener 60 is fed into the passage 36 through inlet opening 56. In FIG. 2, the inlet opening 56 is generally perpendicular to the figure and therefore is hidden from view. As can be seen, the control surfaces 82 and 86 are in contact and the free end 76 is inserted into the displaced area 66 of fastener 60. In this position, the fingers 70 control the position of the fastener with respect to the plunger 20 and the panel 64. The stop 89 prevents the fingers 70 from pressing against the fastener 60, which is important because the fastener 60 has to be freely fed into the passage 36 between the fingers 70. The stop 89 allows easy insertion of the fastener 60 between the free ends 76 of the fingers 70, but will still allow sufficient engagement between the fingers 70 and the fastener 60 to support and control the fastener during its travel to the panel and through installation. While the surfaces 82 and 86 are in contact, the fastener 60 is controlled by the fingers 70 as it moves with respect to the nosepiece 32. The control is achieved by the surfaces 82 and 86 sliding against each other and maintaining engagement between the free end 76 and displaced area 66 of fastener 60.

Referring now to the left side of FIG. 2, the fastener 60 has been installed into panel 64. The fingers 70 have controlled the position of the fastener 70 throughout its travel from the introduction of the fastener 70 into the passage 36 through installation into the panel 64. As can be seen, the control surfaces 82 and 86 are no longer engaged. There is a clearance space 85 between the control surface 82 and the offset portion 88 of nosepiece 32 and between the offset 80 of finger 70 and control surface 86 of nosepiece 32. This clearance space 85 allows the fingers 70 to pivot with respect to the plunger 20 and the fastener 60. To facilitate the pivoting of finger 70, the finger 70 is rounded about pivot pin 72.

As the press opens, the plunger 20 is pulled away from the fastener 60. This movement causes the free ends 76 of fingers 70 to cam against the displaced area 66 and pivot the fingers 70 into the clearance space 85 away from the fastener 60 to release fastener 60. As the press 2 continues to open, the transition surfaces 83 and 87 cam against one another to smoothly bring the control surfaces 82 and 86 into sliding contact. As the press reaches its open position, the feeding device feeds another fastener 60 into the plunger passage 36 between the closed fingers 70 for another installation cycle.

As discussed above, the fastener 60 has a displaced area 66 which mates with the free end 76 of the fingers 70. As illustrated, the displaced area 66 is between the top 65 and bottom or installation end 67 of fastener 60. By positioning the displaced area 66 above the installation end 67, the fingers 70 can control the position of the fastener 60 throughout its path of travel as discussed above. The displaced area 66 is preferably a lateral groove which extends across the width of the fastener 60. See FIG. 4. It should be appreciated that the displaced area could take many different forms, although a concave groove will be preferred in some applications. It could be a notch, a flange, a dimple, a protrusion, a ridge, etc. It will be understood by those of ordinary skill in the art that the free end 76 of the fingers would be shaped to compliment the shape of the displaced area 66.

Figure 3:
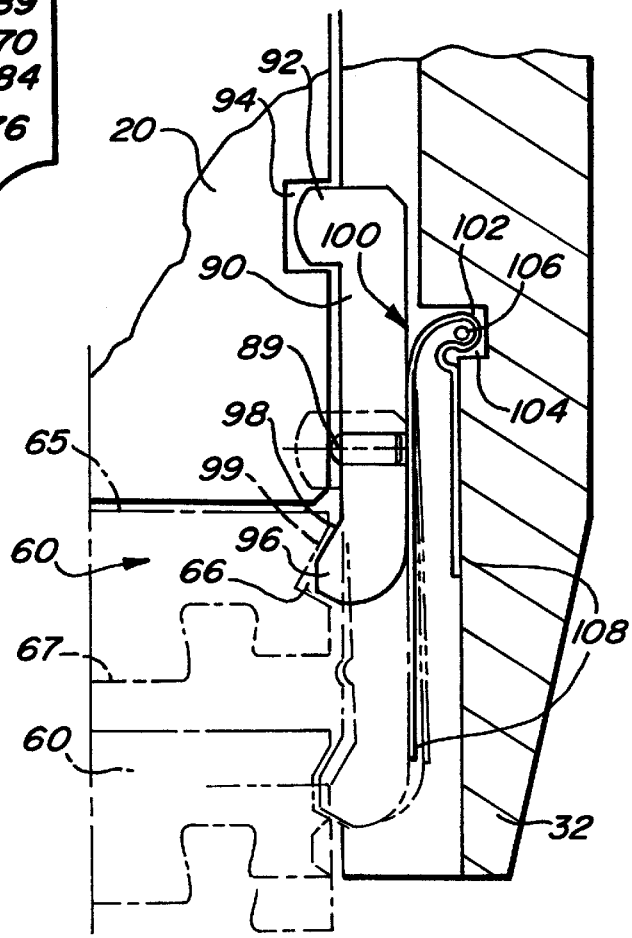
FIG. 3 is a longitudinal cross-section of a further embodiment of the retaining device.

With reference to FIG. 3, a further embodiment of the present invention is illustrated. In this embodiment, the fingers 90 are attached to the plunger 20 through the engagement of a protrusion 92 within a recess 94 formed in the plunger 20. As illustrated, the free and of the protrusion 92 is rounded to facilitate pivoting of the finger 90. The finger 90 has a free end with a cam surface 98 which is adapted to cam against the cam surface 99 of the displaced area 66 of fastener 60. As in the previous embodiment, the finger 90 has a stop 89 to limit the amount of engagement between the finger 90 and the fastener 60. As illustrated in FIG. 3 in solid lines, the fastener 60 has just been fed between fingers 90, and there is space between the fingers 90 and fastener 60.

Unlike the previous embodiment, this embodiment uses a biasing means 100 to force the finger 90 in the direction of the fastener 60. The biasing means 100 is illustrated as a spring with a head 102. The spring 100 is positioned in a slot 103 formed in nosepiece 32 and the head 102 is inserted into a recess 104 in the nosepiece 32. A pin 106 extends through the head to hold the spring 100 in place during assembly. The spring includes opposed legs 108 that bias against the finger 90 and the nosepiece 32 to force the finger 90 in the direction of the plunger 20.

In operation, the finger 90 slides along the leg 108 and is biased into the fastener 60. The solid lines of FIG. 3 show the open position of the press 2 with the fastener 60 fed between the fingers 90. The phantom lines illustrate the position of the fingers 90 and the spring 100 as the fastener 60 is installed. As can be seen, as the press opens, the cam surface 98 cams against cam surface 99 and pivots the fingers 90 against the bias of spring 100 releasing the fastener 60.

Figure 4:
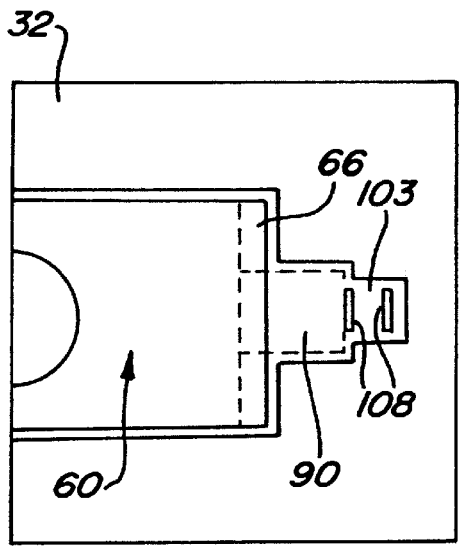
FIG. 4 is an end view of the tool of FIG. 3.

As can be seen in FIG. 4, the fastener 60 is spaced from the walls of the nosepiece 32. It should be appreciated by those of ordinary skill in the art that the fastener 60 may slide along the inner walls of nosepiece 32 to further guide the fastener 60 throughout its travel path.

Figure 5:
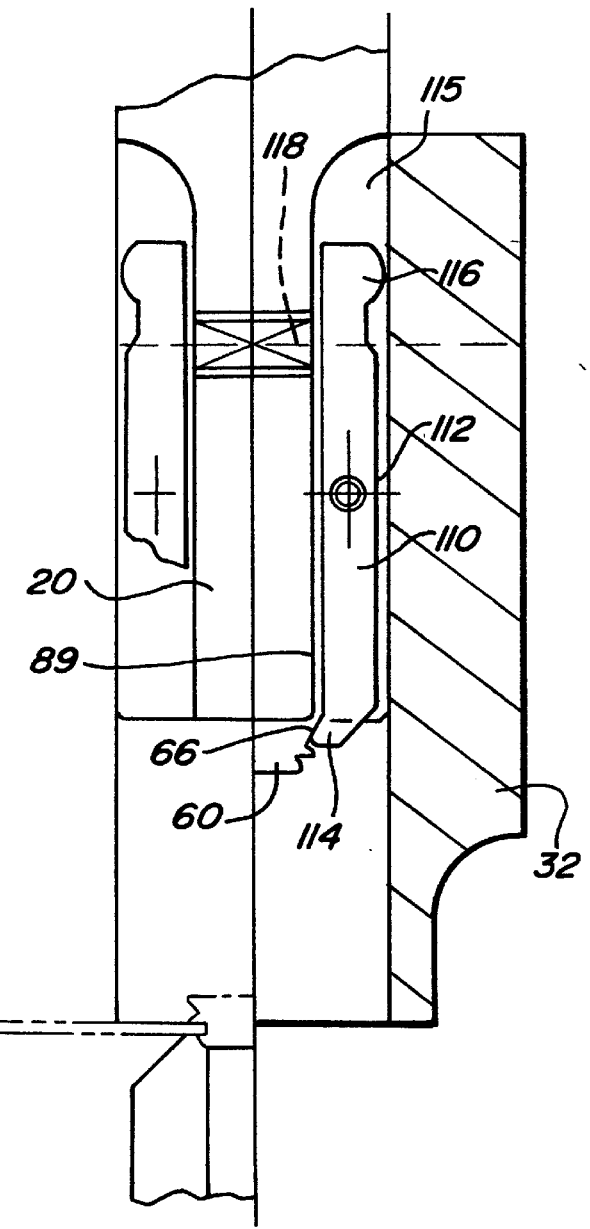
FIG. 5 is a longitudinal cross-section of a further embodiment of the retaining device.

With reference to FIG. 5, a further embodiment of the present invention is illustrated. In this embodiment, the fingers 10 are pivotally mounted to the plunger 20 by a pivot pin 112. As in the previous embodiments, the free end 114 of finger 110 engages the displaced area 66 of fastener 60. The fingers 110 are mounted in slots 115. The opposite end of the finger 110 has a cam surface 116 which engages the inner wall of nosepiece 32. The cam surface 116 is a rounded surface to reduce friction. A stop 89 is provided as in the previous embodiments. In this embodiment, the fingers 110 are biased by a coil spring 118 to pivot the free end 114 in the direction of the plunger 20. After the fastener is installed, the fingers 110 cam against the displaced area 66 to overcome the bias of springs 118 and release fastener 60.

In accordance with the provisions of the Patent Statutes, the present invention has been described in what is considered to represent its preferred embodiment. However, it should be noted that the invention can be practiced otherwise and is specifically illustrated and described without departing from its spirit or scope.

What is the claimed:

1. An installation tool for installing a fastener on a panel, the installation tool comprising:

a main body having a bore and a fastener entry opening for inserting fasteners into the bore adjacent the plunger;

a plunger reciprocally mounted within the bore of the main body, the plunger having a free end for engaging the fastener when the fastener is in the bore for driving the fastener through the main body and to said panel;

at least two fingers operatively connected to and pivotally mounted with respect to the plunger and the fastener, the fingers extending beyond the free end of the plunger for engaging the fastener and holding the fastener adjacent to the plunger as the plunger drives the fastener to the panel;

a sleeve reciprocally mounted about the plunger, said sleeve having a contoured inner wall; the fingers have a contoured outer edge adjacent the inner wall of the sleeve, the contoured outer edge of the fingers and the contoured inner edge of the sleeve being juxtaposed and cooperatively shaped to pivot the fingers into and out of engagement with the fastener as the plunger and the sleeve move with respect to one another; and whereby the fastener is positively held in a properly aligned position with respect to the plunger and the panel from the point that the fastener enters the bore to engagement of the fastener against the panel to ensure a properly installed fastener.

2. The installation tool of claim 1, further including biasing means to bias the fingers in the direction of the plunger to positively engage the fastener.

3. The installation tool of claim 1, wherein each of said fingers having a leg portion and a foot portion, said foot portion extending inwardly in the direction of the plunger for engaging the fastener.

4. The installation head of claim 3, wherein the foot portion is curved to cam against the displaced area of the fastener to release the fastener as the fastener is installed.

* * * * *